United States Patent [19]

Schmidt et al.

[11] 4,073,355

[45] Feb. 14, 1978

[54] CRUCIBLE

[75] Inventors: Walter Schmidt; Walter Stählin, both of Schaffhausen, Switzerland

[73] Assignee: Prolizenz AG., Chur, Switzerland

[21] Appl. No.: 661,438

[22] Filed: Feb. 26, 1976

[30] Foreign Application Priority Data

Apr. 14, 1975 Switzerland .................... 5461/75

[51] Int. Cl.[2] ........................................... G01G 17/00
[52] U.S. Cl. .................................. 177/83; 23/273 SP; 156/601; 177/132; 177/210 R; 310/104
[58] Field of Search ................................ 177/83–88, 177/60, 211, 210 R; 219/10.43, 10.49, 10.75; 23/273 SP; 156/601; 13/DIG. 1, 1; 310/104

[56] References Cited
U.S. PATENT DOCUMENTS

| 2,705,762 | 4/1955 | Pile | 310/104 |
| 2,908,004 | 10/1959 | Levinson | 156/601 |
| 2,990,256 | 6/1961 | Louins | 156/601 X |
| 3,259,467 | 7/1966 | Rummel | 156/601 X |
| 3,822,111 | 7/1974 | Suzuki | 23/273 SP |
| 3,934,983 | 1/1976 | Bardsley | 23/273 SP |

Primary Examiner—Joseph W. Hartary
Attorney, Agent, or Firm—Ernest F. Marmorek

[57] ABSTRACT

A weighing device for the automatic regulation of a crystal-growing operation includes an upright shaft on which a crucible for a crystal melt is supported. The shaft is journalled for rotation and has limited freedom of movement in downward direction under the weight of the crucible and the melt therein. Weight-responsive signal-generating devices are engaged by the shaft or components associated therewith, so that pressure is exerted upon these devices to different degrees, in dependence upon the weight of the melt in the crucible. These devices produce signals as a function of the weight acting upon them, and these signals in turn control the crystal-growing operation. The shaft is rotatable by a drive arrangement which does not require physical contact with the shaft to rotate the same.

20 Claims, 3 Drawing Figures

CRUCIBLE

CROSS REFERENCE TO RELATED APPLICATIONS

Reference is had to the patent applications Ser. No. 661,439 filed Feb. 26, 1976; Ser. No. 661,434 filed Feb. 26, 1976; Ser. No. 664,700 filed Mar. 8, 1976; and Ser. No. 661,433 filed Feb. 26, 1976, each entitled "CRUCIBLE". Each of the aforementioned cases are assigned to Prolizenz A. G., the assignee of the instant application.

BACKGROUND OF THE INVENTION

This invention relates in general to a weighing device, and more particularly to a weighing device which is especially suitable for automatically regulating a crystal-growing process or operation.

The growing of crystals is well known. For example, there is the so-called Czochralski-method in which a crystal melt is provided which is contacted by a suitable instrumentality, e.g. an already existing crystal, which is then slowly raised while being rotated. The existing crystal is sometimes called a "seeding" crystal. As the seeding crystal is rotated and slowly raised, a quantity of the melt is being drawn up with it and now forms a new crystal whose diameter is a very sensitive function of the temperature of the melt. Increasing melt temperature causes a decrease in the crystal diameter, and decrease in temperature causes an increase in the crystal diameter, i.e. the diameter of the crystal that is being produced.

In many instances, for example for quality reasons or for economic reasons, a precise diameter of sequence of diameters is prescribed over the longitudinal axis of the crystal, and no deviations from the diameter or from the sequence of diameters is permissible or desired. In such a case, the controlling of the crystal growth in order to assure the desired diameter or diameter sequence causes great difficulties for the operators of the crystal-growing equipment, because a control by visual observation of the boundary surface of the growing crystal and the melt, and an appropriate readjustment of the melt temperature by regulating the heat supplied to the melt, requires extreme care and much experience.

These conditions are aggravated by the fact that crystal growth in accordance with the Czochralski-method as a rule requires anywhere between several hours to several days; during this operation, which is required for the growth of a single crystal, the growth must be continuously supervised by experienced operators. In many instances, however, technical reasons make a visual observation of the crystal diameters impossible, or possible only with great difficulty, at least during certain stages of the growth process. These technical reasons have to do, for example, with a drop in the level of the melt or with the growth of crystals in accordance with the liquid encapsulated Czochralski-method under high pressure. Because of this, it is highly desirable to provide for an automatic regulation of the growing process in order to obtain the desired diameter control of the growing crystal, with a view not only of assuring the desired diameter or sequence of diameters along the crystal axis but also of reducing the operating cost in terms of the personnel required for supervision, and in addition of making it possible to operate the very expensive crystal growing apparatus on a more uniform time basis.

Arrangements for providing automatic regulation are already known. One of these arrangements regulates the growing process on the basis of the weight change of the growing crystal or of the melt from which the crystal is being withdrawn. The crystal or the melt are being weighed and a feed-back loop is provided in which the actual weight changes are compared with a reference value or values corresponding to the weight changes that should exist if the desired diameter or sequence of diameters are being obtained. Existing differences are then utilized for automatically controlling the supply of thermal energy to the melt.

If only simple crystal growing conditions are involved, the crucible containing the crystal melt can be placed directly upon a commercially available scale, together with the necessary baffles which provide for radial and axial shielding against thermal energy. However, in many instances the crucible must be constantly rotated during the crystal growing process in order to compensate for temperature gradients. If that is the case, then the necessary drive which causes the turning of the crucible influences the weighing results to such an extent that they are no longer reliable. In this connection it must be kept in mind that the weight variations between the actual weight and the reference weight are on the order of between several milligram and several gram, i.e. that they are very small and make high requirements of the resolution capability of the scale, so that they can be very readily influenced by the drive components needed to rotate the melt-containing crucible.

Moreover, if the crystal-growing space must be closed because the operation is carried out at vacuum or at high pressures, then scales of the type mentioned above cannot be used at all, because a weight-transmitting member of the scale would have to pass out of the sealed environment through an appropriate seal, and the friction between the movable component of the scale and the seal would be sufficient to cause a totally incorrect indication of the weight. On the other hand, it is not possible to reverse the relationship and to locate the scale in the sealed crystal-growing space itself, because the sclaes are too large for this purpose and the high pressures and aggressive vapors existing in the crystal-growing space would have deleterious influences upon the scale and on the operation of the scale.

As these problems were recognized, attempts were made to replace the scales by electronic force measuring cells. In principle, this can be done but difficulties again arise if the melt-containing crucible must be rotated. To some extent, these difficulties can be overcome by rotating the measuring cells together with the crucible. In that case, however, it is necessary to provide slip-ring contacts in order to supply electrical energy to and remove signals from the measuring cells. Such slip-ring contacts are subject to malfunction because of the generally corrosive environment in which they must be operated, and in addition to that they tend to produce interference. Also, some of the measuring cells are adversely influenced by radial forces, for example those which are caused by rotating eccentric loads.

SUMMARY OF THE INVENTION

It is a general object of this invention to avoid the aforementioned prior-art drawbacks.

In particular, it is an object of the present invention to provide an improved weighing device, which is particularly but not exclusively suitable for the automatic regulation of a crystal-growing operation, and which is not subject to the prior-art disadvantages.

Pursuant to these objects, and to further objects which will become apparent throughout the remainder of this description, a feature of this invention resides in a weighing device, particularly for the automatic regulation of a crystal-growing operation, which comprises an upright shaft, journalling means that journals the shaft for rotation, and load supporting means which is carried by the shaft and adapted for supporting a load to be weighed so that the weight of the load acts lengthwise of and is borne by the shaft. Weight-responsive signal generating means is adapted to generate signals when subjected to different weights. Mounting means suspends the shaft on the signal generating means so that the weight of the load is transmitted to the signal generating means. Drive means is provided for rotating the shaft without physically engaging the same.

The weight-responsive signal generating means may be in form of electronic force measuring cells which may be arranged at the corners of an imaginary equilateral triangle so that periodic changes in the measured weight which result from tumbling movements of the melt in the rotating load supporting means, can be eliminated by simple analog or digital addition of the signals generated by the cells and which are proportional to the weight components thus leaving the indication of the true weight.

The signal generating means, such as the aforementioned cells, are stationary and the signals can thus be obtained from them without the slip-ring contacts that are required in the prior art. This avoids the disadvantages attendant upon the use of slip-ring contacts. Moreover, with the arrangement of the present invention the measuring cells can be so located that they are in no way subject to the influence of the high temperature and the corrosive media involved in the growth of crystals.

In order to eliminate a further source of difficulties, the shaft is mounted in a low-friction manner both axially and radially in a frame which may be made adjustable relative to the measuring cells, for example by means of adjusting screws, and the shaft is driven by drive means which is capable of rotating it without physically contacting it. Magnetic drive means are suitable for this purpose and eliminate any need for physical contact and the resulting friction.

The present invention will be described further hereafter with reference to exemplary embodiments. It should be understood, however, that these are by way of example only and not to be considered limiting.

DESCRIPTION OF THE PREFERRED EMBODIMENTS

Figure 1A:
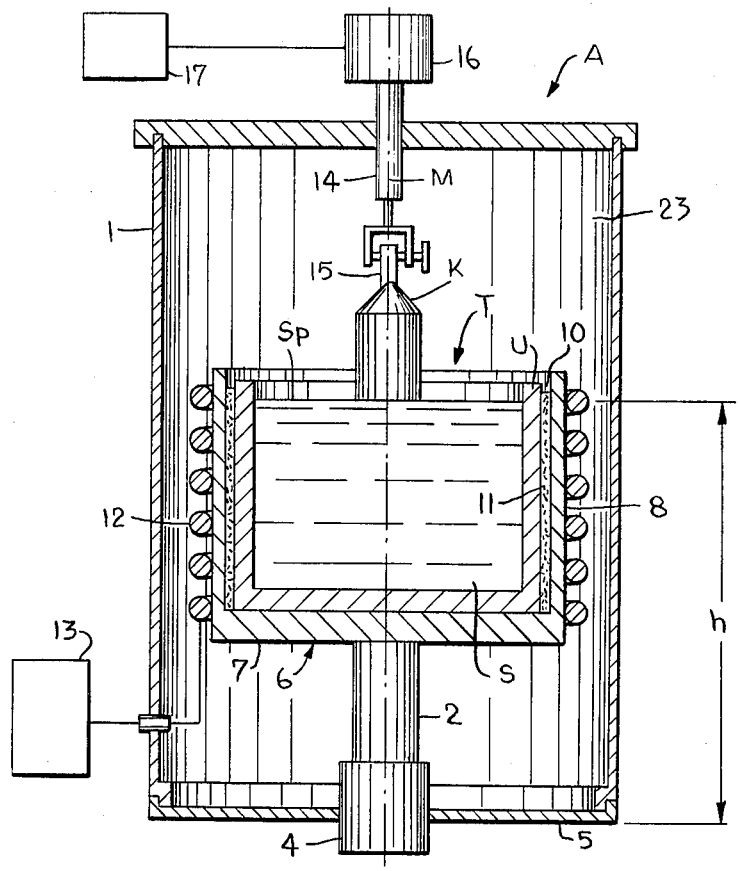
FIG. 1A is a somewhat diagrammatic vertical section through an apparatus according to one embodiment of the invention.
Figure 2:
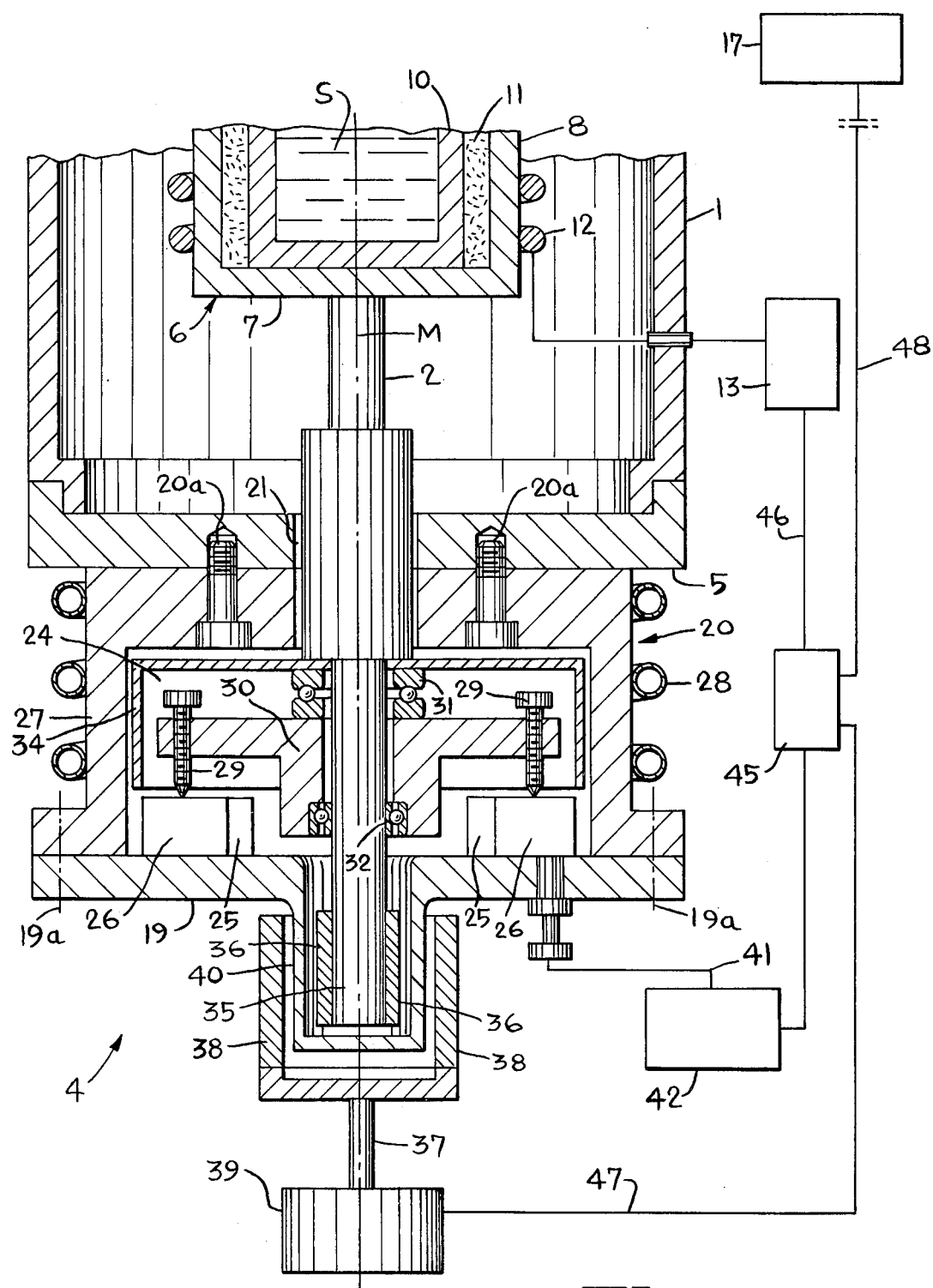
FIG. 2 is a diagrammatic enlarged sectional detail view, showing the drive used in the embodiment of FIGS. 1A or 1B.

FIG. 1A illustrates one embodiment of the invention. Reference numeral 1 identifies the housing of an apparatus A for growing of crystals, for example, crystals according to the Czochralski-method. In the interior 23 of the housing 1 there is provided a vertical shaft 2 which is located in the vertical axis M of the housing 1 and which carries a supporting device 6 for a crystal melt crucible T. The crucible T accommodates a crystal melt S whose upper level Sp is spaced from the bottom wall 5 of the housing 1 by a distance h. Provided on the bottom wall 5 is a drive 4 which is shown only by way of a box in FIG. 1A, and whose details are shown in FIG. 2 and will be described later with reference to that Figure.

The supporting device 6 comprises a bottom plate 7 and a circumferentially extending thermally insulating wall 8. The crucible T is supported on the bottom plate 7 and its own circumferential wall U forms an annular gap 10 with the wall 8; the gap 10 is filled with aluminum-oxide powder 11 ($Al_2O_3$). The wall 8 is surrounded by the convolutions of a high-frequency induction coil 12 which is connected, as illustrated, to a diagrammatically shown high frequency generator 13.

A seeding crystal 15 is supported on a vertical drawing rod 14 and initially extends into the melt S downwardly of the upper level Sp thereof; the crystal 15 is gradually moved in upward direction by raising the drawing rod 14 under the control of a device 16 which in turn is controlled in its operation by a control apparatus 17. As the seeding crystal 15 is raised out of the melt S it draws with it quantities of the melt which form a growing crystal K. The device 16 is a motor with a gearing which rotates the rod 14; apparatus 17 regulates the output power of the motor of device 16. In its simplest form, apparatus 17 can be a potentiometer.

Figure 1B:
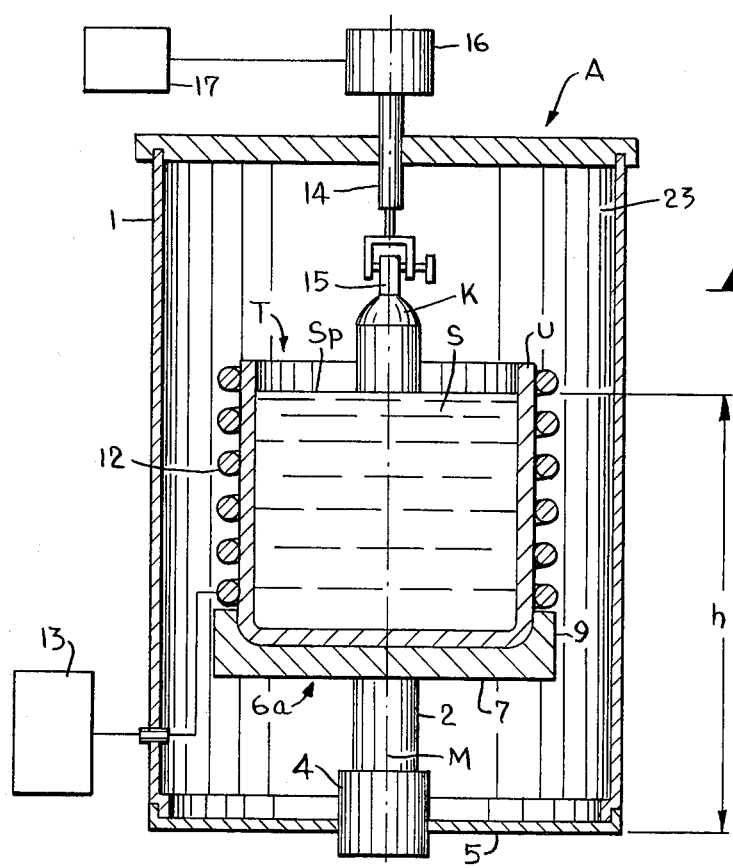
FIG. 1B is a view similar to FIG. 1A, but showing a different embodiment.

The apparatus shown in FIG. 1B is largely similar to that in FIG. 1A and like reference numerals are employed to designate like components.

In fact, the apparatus in FIG. 1B differs from that in FIG. 1A only in that it has a somewhat differently constructed supporting device 6a. The device 6a again has a bottom plate 7 which, however, is provided with a rather low circumferentially extending wall 9 instead of the wall 8 in FIG. 1A. Thus, in FIG. 1B the circumferential wall U of the melt-containing crucible T is directly surrounded by the convolutions of the high frequency induction coil 12 which again is connected to the high frequency generator 13.

Details of the drive 4, which is used in both of the apparatuses of FIGS. 1A and 1B, are shown in FIG. 2.

It will be seen in FIG. 2 that located below the bottom wall 5 of the housing 1 is provided a pressure chamber 20 which is secured to the bottom wall 5 by means of screws 20a so that it can be readily removed. Pressure chamber 20 is bounded by a circumferentially extending wall 27 bounding a downwardly open side of the pressure chamber, which side is closed by a removable bottom plate 19 held in place by the only diagrammatically illustrated screws 19a. To provide for pressure equalization between the chamber 20 and the interior 23 of the housing 1, the two are in communication via a narrow annular gap 21 surrounding an enlarged diameter portion of the shaft 2 that passes through the top wall bounding the pressure chamber 20 and through the bottom wall 5 of the housing 1. In the interior 24 of the pressure chamber 20, mounted fixedly on the bottom plate 19, are several (in the illustrated embodiment three) force measuring cells 26 each of which is at least partially surrounded by cooling fins 25. In the particular embodiment, the three force measuring cells 26 are located at the corners of an imaginary equilateral triangle; however, only two of the cells 26 are visible in FIG. 2. Cells of this type are known; they determine weight differences in known manner by semi-conductor deformation, i.e. they yield electrical signals whose magnitude is a function of the force exerted upon the cells 26, the force being a function of the weight resting on the shaft 2, and the weight of course being the weight of the crucible T and the melt S therein.

Cooling coils 28 surround the wall 27 of the chamber 20, or may even be located within the wall 27. These cooling coils 28 may be connected to a source of cooling fluid (not shown) and, in conjunction with the cooling fins 25 on the cells 26, they assure a weighing operation that remains unimpeded by temperature or corrosion influences.

A frame 30 is provided which is supported on the measuring cells 26 by means of adjusting screws 29 so that, by turning the screws 29 in requisite direction, the frame 30 can be raised or lowered with respect to the cells 26. Between the frame 30 and the shaft 2 ball bearings are located. Thus frame 30 does not rotate with shaft 2. An anti-friction bearing 31 is provided on the frame 30 and a smaller-diameter portion of the shaft 2 is journalled for rotation in the bearing 31. Downwardly of the bearing 31 the frame 30 carries at least one further anti-friction bearing 32 in which the shaft 2 is also journalled. A shield or baffle 34 straddles the frame 30 and the bearing 31 and serves to intercept thermal energy that is radiated from the interior 23 of the housing 1 through the gap 21, so as to keep it as much as possible from impinging upon the cells 26. The baffle 34 in the illustrated embodiment is mounted on the shaft 2 for rotation therewith, but it could also be stationary.

The bottom plate 19 of the chamber 20 is formed with a downwardly extending cup-shaped depression 40 into which an end portion 35 of the shaft 2 extends with clearance. The end portion 35 carries a plurality of bar magnets 36 which surround it in form of an annulus. A further annulus of bar magnets 38 surrounds the depression 40 with clearance and can be rotated by a shaft 37 of a motor and gear unit 39 of conventional construction. Thus, when the annulus of bar magnets 38 is rotated, the magnetic forces acting between the bar magnets 38 and 36 causes the latter and thereby the shaft 2, to become entrained but without any friction that would otherwise act upon the shaft 2 as a result of the drive. In order to eliminate axial magnetic forces which might influence the weight-indicating signal, both the bar magnets 36 and bar magnets 38 are provided in even numbers and are arranged in alternating pairs with respect to their polarity.

Conductors 41 (only one shown) are provided which extend from the cells 26 to an adder and comparator 42 which provides a regulating signal that is supplied to a regulating device 45 from where a signal 46 is furnished to the high frequency generator 13 to regulate the operation of the same in accordance with any deviation in the actual weight of the melt S from the reference weight with which the device 42 compares the actual-weight signals received from the cells 26. Thus, the temperature of the melt S is varied by the constant readjustments in the operation of the high-frequency generator 13 and consequently of the coil 12, and deviations in the actual diameter of the growing crystal K from the desired diameter — as measured in terms of deviations of the actual versus the reference weight of the melt S — are corrected automatically.

In addition to controlling the operation of the high frequency generator 13, the regulator device 35 may also be connected via a line 47 with the drive 39 to influence the rotational speed of the shaft 2 as a function of the signals derived from the cells 26, and/or it may be connected via a line 48 with the control device 17 which operates the drawing device 16 to thus vary the speed at which the seeding crystal 15 is moved upwardly as a function of the signals received from the cells 26.

It will be understood that the invention is not to be considered limited to the details of the two exemplary embodiments which have been illustrated. Rather, the protection sought is that which is encompassed by the appended claims.

Substances such as gallium phosphide, gallium arsenide and indium phosphide may be used as melt.

An assembly unit capable of producing electrical signals whose magnitude is a function of the weight resting on the unit, can serve as cell 26.

For example, a semi-conductor element can be used which is deformed by force exerted by the weight resting on it, whereby the resistance of the semi-conductor is changed.

Another example is a coil core wherein the displacement of the coil core in a cell produces a change in the inductivity of the coils.

The devise 42 which can be a digital or analog computer or an electronic comperator and electronic discalculator produced and sold by Hewlett-Packard, Model 9810 has been found suitable.

The regulating device 45 can be a potentiometer.

We claim:

1. A weighing device, particularly for the automatic regulation of a crystal-growing operation, comprising
an upright shaft;
journalling means journalling said shaft for rotation;
load supporting means carried by said shaft and adapted for supporting a load in form of a melt to be weighed so that the weight of said load acts lengthwise of and is borne by said shaft;
weight-responsive signal generating means comprising at least one cell which produces an electric current by semi-conductor deformation, of a magnitude which varies as a function of the degree of mechanical compression exerted by the load to which said cell is subjected;
mounting means suspending said shaft on said signal generating means so that the weight of said load is transmitted to said cell of said signal generating means; and
drive means for rotating said shaft without physically engaging the same and without deteriorating or physically influencing the axial freedom of motion of said shaft.

2. A device as defined in claim 1, wherein said load-supporting means comprises a crystal-melt crucible.

3. A device as defined in claim 1, said shaft having an end portion; and further comprising wall means surrounding said end portion and forming a chamber in which said end portion is located.

4. A device as defined in claim 3, wherein said drive means comprises drive elements located outside said chamber.

5. A device as defined in claim 1, said shaft having an end portion; further comprising wall means surrounding said end portion and forming a chamber in which said end portion is located; and wherein said drive means comprises at least one vertically arranged first magnet member on said end portion, and at least one cooperating vertically arranged second magnet member arranged to orbit said end portion outside said chamber so as to entrain said first magnet member.

6. A device as defined in claim 5, wherein said chamber includes a cylindrical portion coaxial with said end portion of said shaft, said second magnet member being arranged to orbit said cylindrical portion.

7. A device as defined in claim 5, said drive means comprising additional first magnet members forming a first annulus on said shaft end portion, and additional second magnet members forming a second annulus about said first annulus outside said chamber, each annulus being composed of an even number of bar magnets arranged in alternating pairs of opposite polarity.

8. A device as defined in claim 5, further comprising a housing of a crystal-growing apparatus, said load supporting means being located in said housing; said wall means being removably mounted on said housing and said chamber communicating with the interior of said housing.

9. A device as defined in claim 8, said interior of said housing being subject to heating; said signal generating means comprising cell means located in said chamber and each adapted to produce an electric current whose magnitude is a function of the degree of mechanical compression to which said cell means are subjected; and further comprising cooling means for cooling at least one of said cell means and chamber, respectively.

10. A device as defined in claim 9, and further shield means for preventing heat radiation from said housing from heating said cell means and/or chamber, respectively.

11. A device as defined in claim 10, wherein said shield means comprises at least one shield secured to and rotatable with said shaft.

12. A device as defined in claim 11, wherein said mounting means comprises a frame which carries said journalling means and is located in said chamber; said shield overlying said frame, and said journalling means comprising an anti-friction bearing located intermediate said shield and said frame.

13. A weighing device, particularly for the automatic regulation of a crystal-growing operation, comprising an upright shaft;
journalling means journalling said shaft for rotation;
load supporting means carried by said shaft and adapted for supporting a load to be weighed so that the weight of said load acts lengthwise of and is borne by said shaft;
weight-responsive signal generating means adapted to generate signals when subjected to different weights, said signal generating means comprising a plurality of cells which are equi-angularly spaced about said shaft and each of which produces an electric current of a magnitude which varies as a function of the degree of mechanical compression to which the cell is subjected;
mounting means suspending said shaft on said signal generating means so that the weight of said load is transmitted to said signal generating means; and
drive means for rotating said shaft without physically engaging the same.

14. A device as defined in claim 13, wherein said signal generating means comprises three of said cells which are located at the respective corners of an equilateral triangle.

15. A device as defined in claim 13, wherein said mounting means comprises a frame which carries said journalling means, said mounting means supporting said frame on said cells.

16. A device as defined in claim 15, wherein said mounting means further comprises adjusting means for adjusting the position of said frame and shaft relative to said cells.

17. A device as defined in claim 16, wherein said adjusting means comprises set screws extending between said frame and said cells.

18. A device as defined in claim 16, wherein said journalling means comprises at least one anti-friction radial and axial thrust bearing.

19. A weighing device particularly for the automatic regulation of a crystal-growing operation, comprising an upright shaft having an end portion;
wall means surrounding said end portion and forming a chamber in which said end portion is located, said wall means including a circumferential wall and a bottom wall, said bottom wall being formed with a hollow cylindrical projection forming a cylindrical portion of said chamber and accommodating said end portion of said shaft;
journalling means journalling said shaft for rotation;
load supporting means carried by said shaft and adapted for supporting a load to be weighed so that the weight of said load acts lengthwise of and is borne by said shaft;
weight-responsive signal generating means adapted to generate signals when subjected to different weights, comprising a plurality of cells mounted on said bottom wall and each adapted to produce an electric current of a magnitude which varies as a function of the degree of mechanical compression to which the respective cell is subjected;
mounting means suspending said shaft on said signal generating means so that the weight of said load is transmitted to said signal generating means; and
drive means for rotating said shaft without physically engaging the same, including at least one first magnet member on said end portion, and at least one cooperating second magnet member arranged to orbit said end portion outside said chamber so as to entrain said first magnet member.

20. A weighing device, particularly for the automatic regulation of a crystal-growing operation, comprising an upright shaft;
journalling means journalling said shaft for rotation;
load supporting means carried by said shaft and adapted for supporting a load to be weighed so that the weight of said load acts lengthwise of and is borne by said shaft, said load supporting means comprising a crystal-melt crucible;
weight-responsive signal generating means adapted to generate signals when subjected to different weights, including a plurality of cells which each produce an electric current of a magnitude which is a function of the degree of mechanical compression to which the respective cell is subjected;
mounting means suspending said shaft on said signal generating means so that the weight of said load is transmitted to said signal generating means;
drive means for rotating said shaft without physically engaging the same;
crystal drawing means movable relative to said crucible;
a high-frequency induction coil surrounding said crucible and including generator means; and
circuit means including an electronic adder and comparator device and a regulating device receiving signals from said adder and comparator device, said circuit means being operatively connected with all of said cells and with at least one of said drive means, crystal drawing means and generator means.

* * * * *